United States Patent [19]

Scott

[11] Patent Number: 4,649,455

[45] Date of Patent: Mar. 10, 1987

[54] RATING PLUG FOR MOLDED CASE CIRCUIT BREAKER

[75] Inventor: Graham A. Scott, Avon, Conn.

[73] Assignee: General Electric Company, New York, N.Y.

[21] Appl. No.: 856,884

[22] Filed: Apr. 28, 1986

[51] Int. Cl.[4] .............................................. H02H 3/05
[52] U.S. Cl. ...................................... 361/93; 361/413
[58] Field of Search ....................... 361/79, 83, 87, 93, 361/97, 98, 99, 73, 95, 94, 413; 339/32

[56] References Cited

U.S. PATENT DOCUMENTS

| | | | |
|---|---|---|---|
| 3,317,791 | 5/1967 | Price et al. | 361/93 X |
| 3,340,440 | 9/1967 | Minter | 361/413 X |
| 3,440,491 | 4/1969 | Tenenbaum et al. | 361/73 |
| 3,867,000 | 2/1975 | Michalak et al. | 361/413 X |
| 3,903,385 | 9/1975 | Moyer et al. | 361/413 X |
| 4,007,401 | 2/1977 | Kimmel et al. | 361/95 |
| 4,181,389 | 1/1980 | Kiesel et al. | 339/32 |
| 4,181,922 | 1/1980 | Matsko et al. | 361/115 |
| 4,281,359 | 7/1981 | Bayer et al. | 361/115 |
| 4,368,500 | 1/1983 | Conroy, Jr. et al. | 361/94 |
| 4,514,786 | 4/1985 | Charruau | 361/413 |

OTHER PUBLICATIONS

U.S. patent application Ser. No. 631,708, filed Jul. 17, 1984, John Dougherty, "Digital I[2]T Pickup, Time Bands and Timing Control Circuits for Static Trip Circuit Breakers".

U.S. patent application Ser. No. 760,224, filed Jul. 29, 1985, Graham A. Scott et al., "Electronic Circuit Breaker Trip Function Adjusting Circuit".

Primary Examiner—A. D. Pellinen
Assistant Examiner—A. Jonathan Wyrocki
Attorney, Agent, or Firm—Richard A. Menelly; Walter C. Bernkopf; Fred Jacob

[57] ABSTRACT

A removable rating plug connectable with electronic trip molded case circuit breakers allows a common rating plug design to be used over a wide range of industrial rated circuit breakers. The burden resistors carried by the rating plug set the breaker ampere rating in combination with a current transformer tap selection. Electrical connection is made between the rating plug and the trip unit circuit board by a plurality of conductive stabs attached to the plug for insertion within spring connectors arranged on the circuit board. The stabs are keyed to ensure electrical connection with reference ground before, during, and after electrical connection is made with the rating plug burden resistors to protect the current sensing transformers from dangerous overvoltage conditions. Additionally, trip test facility and rating plug integrity indication are provided by test connectors on the rating plug in combination with test circuit implementation on the trip unit circuit board.

9 Claims, 14 Drawing Figures

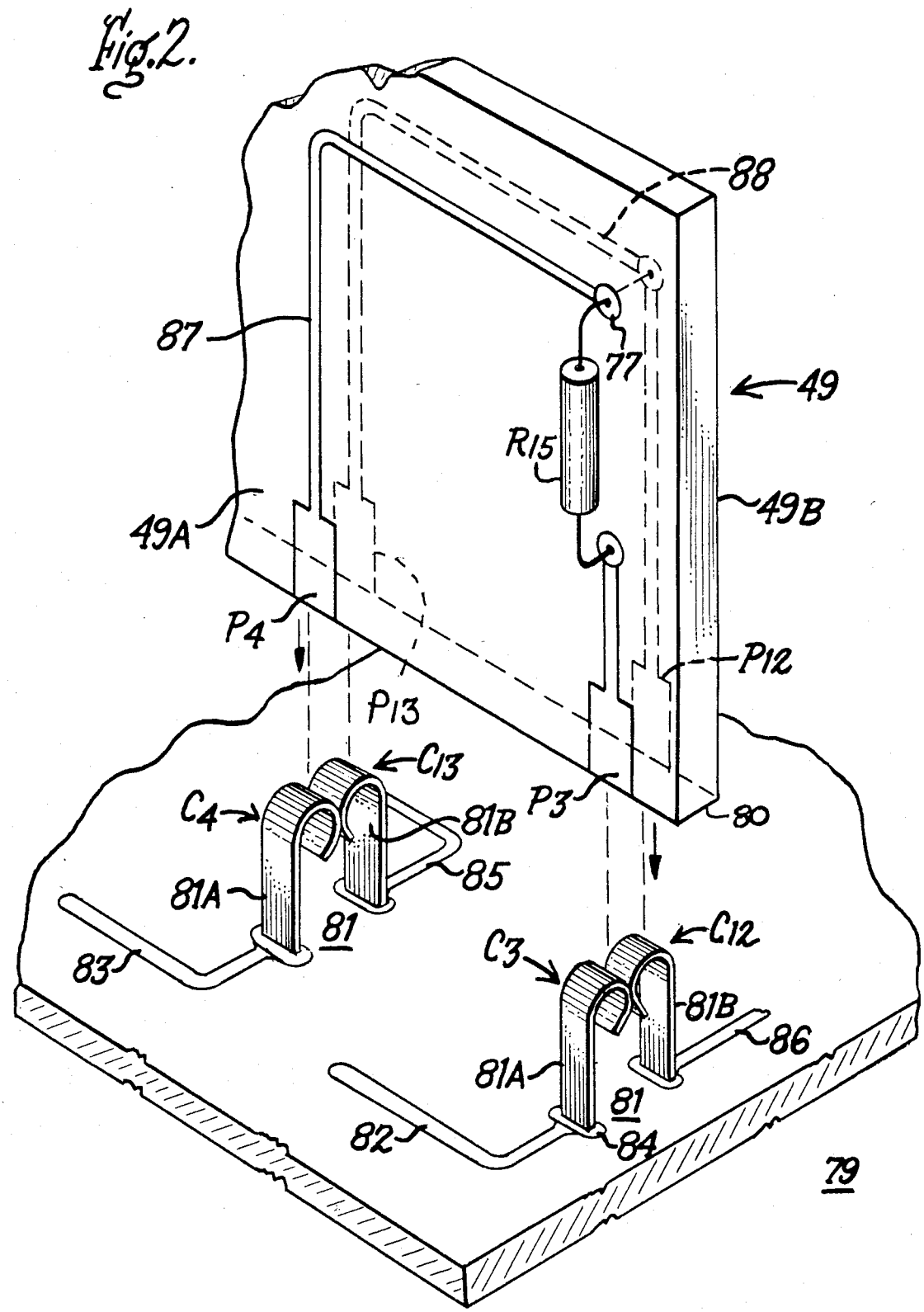

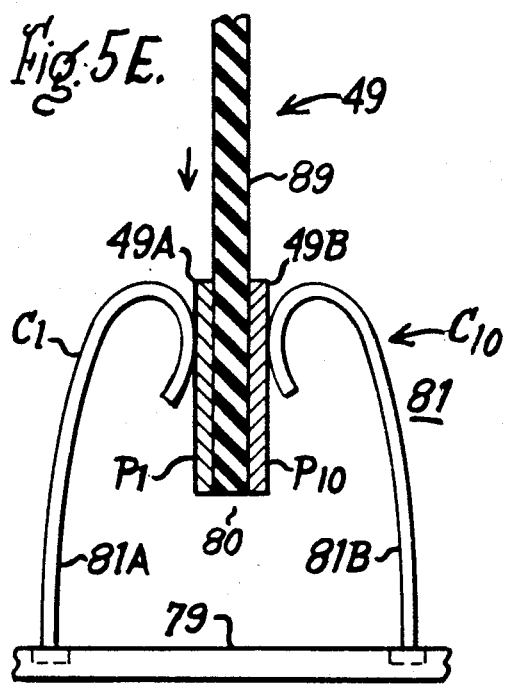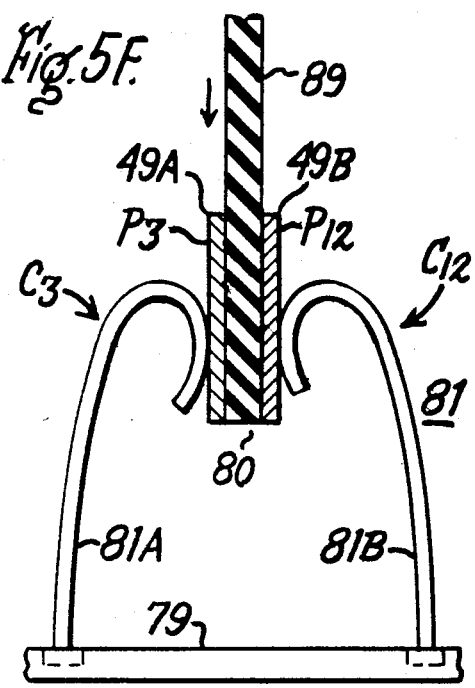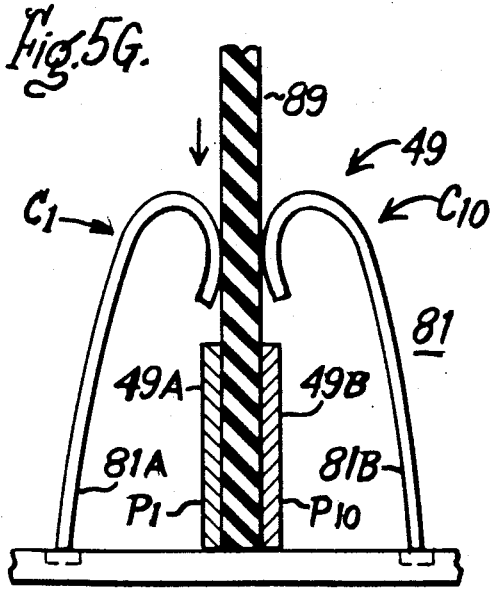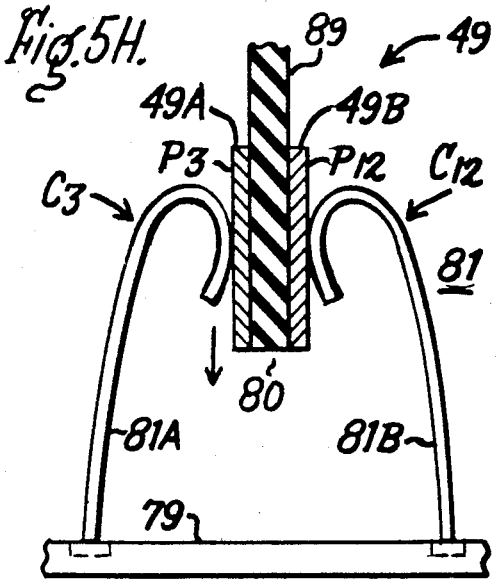

RATING PLUG FOR MOLDED CASE CIRCUIT BREAKER

BACKGROUND OF THE INVENTION

Industrial rated molded case circuit breakers find application over ampere ratings ranging from 50 to 1,200 amperes for any common electronic trip unit design. To set the ampere rating, a burden resistor is electrically connected within the trip unit circuit for generating a voltage representation of the circuit current. To facilitate manufacture and inventory efficiency, a removable rating plug is often employed to allow the burden resistor to be varied without requiring customized tailoring of each trip unit circuit for each circuit breaker ampere rating.

U.S. Pat. Nos. 3,440,491; 4,007,401; 4,181,922 and 4,368,500 all teach removable rating plugs for setting the circuit breaker ampere rating.

Another means of adapting circuit breakers for various ampere ratings comprises changing the current sensing transformer taps to provide the requisite voltage representation of circuit current. U.S. Pat. Nos. 4,181,389 and 4,281,359 disclose means for such adjustment of the current sensing transformer taps.

In order to conform with industry standards, the trip unit circuit must either automatically trip or else default to not more than lowest ampere rating when the rating plug is removed from the trip unit circuit. The simplest known method for providing such a default option is to electrically connect the burden rating resistor carried by the rating plug in parallel with a fixed burden resistor electrically connected within the circuit. Upon removal of the rating plug, the fixed burden resistor then defines the lowest ampere rating of the trip unit circuit.

With the advent of high speed electronic trip unit modules by large scale integration techniques, such as described within U.S. Pat. No. 4,589,052 entitled "Digital I$^2$T Pickup, Time Band And Timing Control Circuit For Static Trip Circuit Breakers", in the name of John Dougherty, it is economically efficient to assemble the rating plug components to the rating plug and to assemble the rating plug to the trip unit circuit board in an automated assembly process.

One purpose of the instant invention is to provide a rating plug wherein the burden resistors and current sensing transformer taps can be economically assembled to the rating plug. A further purpose of the invention is to provide for grounding the current sensing transformer outputs before removing the rating plug from the trip unit circuit. Additionally, the invention proposes to reduce the circuit breaker rating to a minimum default value upon removal of the rating plug from the trip unit circuit. A further purpose of the invention is to provide for trip function selection similar to that described in U.S. patent application Ser. No. 760,224, filed July 29, 1985, entitled "Electronic Circuit Breaker Trip Function Adjusting Circuit" in the names of Graham Scott et al., now abandoned whereby specific overcurrent pickup values can be individually selected.

SUMMARY OF THE INVENTION

A removable rating plug assembly for electronic trip circuit breakers wherein the burden resistors and sensing current transformer taps are adjustable for common assembly over a wide range of circuit breaker ampere ratings. The rating plug assembly electrically grounds the current sensing transformer outputs during removal of the rating plugs from the trip unit circuit. Additionally, the trip unit circuit defaults to a minimum ampere rating when the rating plug is removed from the trip unit circuit. Test trip facility and rating plug integrity are provided by the method of connecting test signals to the trip unit circuit via the rating plug. Overcurrent trip option selection is made by the application of connecting links to the rating plug.

BRIEF DESCRIPTION OF THE DRAWINGS

FIG. 2 is a top perspective view of the rating plug of FIG. 1 in isometric projection from the printed circuit board containing the trip unit circuit of FIG. 1;

FIGS. 5A–5H are enlarged sectional side views of the inventive rating plug in various stages of withdrawal from the trip unit circuit of FIG. 1.

DESCRIPTION OF THE PREFERRED EMBODIMENT

Figure 1:
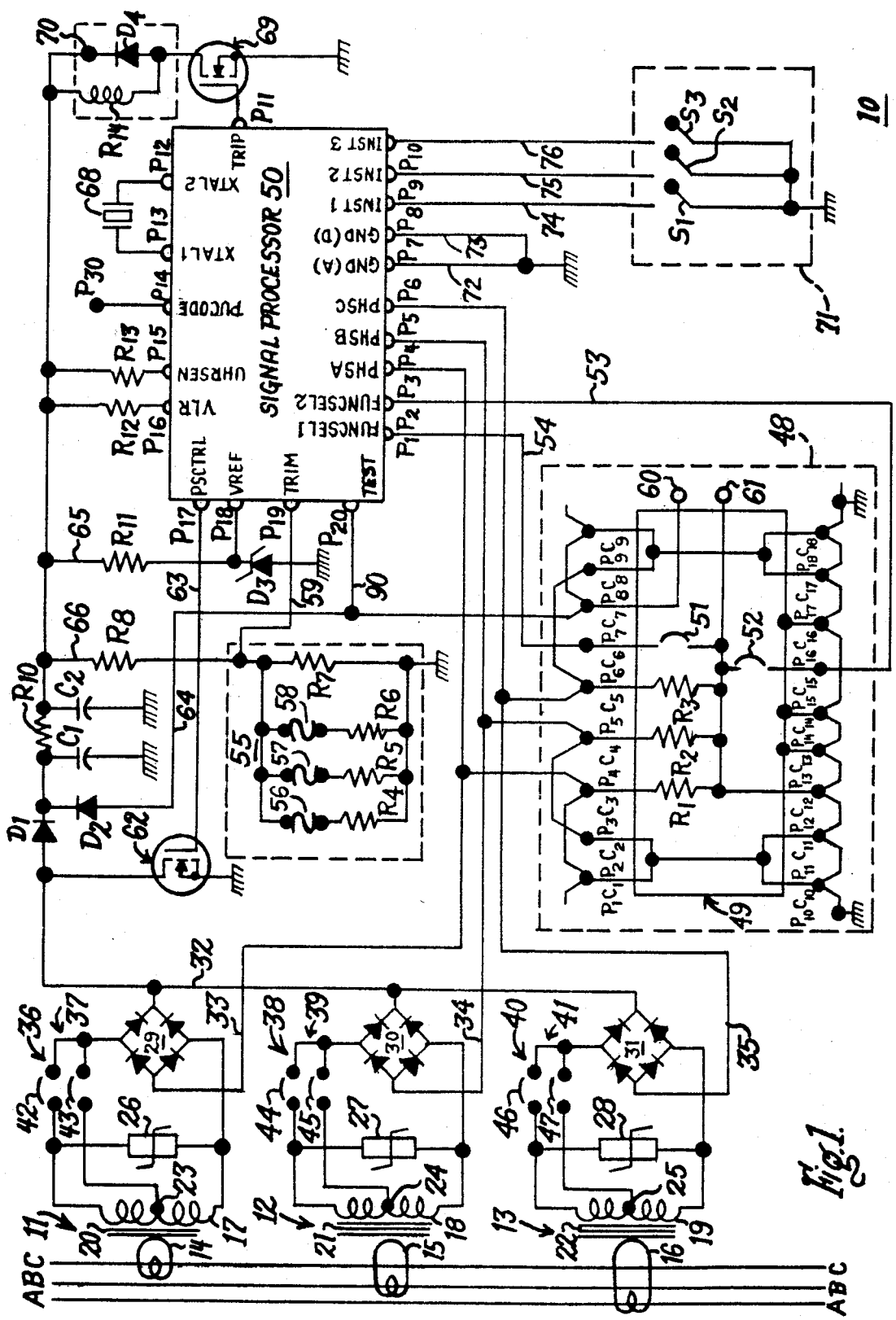
FIG. 1 is a diagrammatic representation of an electronic trip unit circuit including the rating plug circuit according to the invention.

An electronic trip circuit 10 for industrial rated circuit breakers is shown in FIG. 1 wherein three current sensing transformers 11–13 are coupled with the three phases A, B, C of a three phase power line. The transformers each consist of primary windings 14–16, cores 20–22 and secondary windings 17–19. Three separate transformers and associated full wave rectifiers are required for obtaining an RMS representation of the current through the power line. The sensed current is rectified through bridge rectifiers 29–31, which connect to the positive bus 32. Tap windings 23–25 are arranged within the current sensing transformers to provide an output current higher than that developed through the entire secondary winding. A first pair of contacts 36, 38, 40 and connector links 42, 44, 46 are provided to obtain the full secondary winding current and a second set of contacts 37, 39, 41 and connector links 43, 45, 47 are provided to derive the tap winding current. The selection between the entire secondary winding current and the tap winding current allows the coarse breaker ampere rating to be adjusted. The circuit breaker fine ampere rating is set by the rating plug circuit 48 to which a removable rating plug 49 is attached. The first and second pairs of contacts are physically located within the rating plug circuit 48 and the first and second set of connectors are physically positioned on the rating plug 49, but are illustrated, as shown in FIG. 1, for purposes of clarity. The rating plug circuit 48 also includes a plurality of spring connectors $C_1$–$C_{18}$, which are shown interconnected with a corresponding plurality of rating plug stabs or pads $P_1$–$P_{18}$ on the rating plug 49 for purposes which will be described below in some detail. It suffices now to note the connection between rating resistors $R_1$–$R_3$ on the rating plug with the phase conductors 33–35 via pads $P_3$–$P_5$ on the rating plug and connectors $C_3$–$C_5$ on the rating plug circuit. The phase conductors connect into the trip unit signal processor 50 at pins $p_3$–$p_5$. Connector links 51, 52 on the rating plug 49 connect with the function select pins $p_1$, $p_2$ on the signal processor over conductors 53, 54 through pads $P_{16}$, $P_7$ and connectors $C_{16}$, $C_7$, as indicated. The selection of overcurrent pickup functions by connector links on the rating plug is the subject of U.S. patent application Ser. No. 849,998, filed Apr. 10, 1986 and entitled "Static Trip Circuit Breaker With Automatic Circuit Trimming" which Application is incorporated herein for reference and should be reviewed for a detailed description thereof. A first test terminal 60 connects with the test pin $p_{20}$ on the signal processor over conductors 64, 90 and with the positive bus 32 through conductor 64 and diode $D_2$. A second test terminal 61 connects with reference ground through pad $P_{12}$ and connector $C_{12}$ while connecting with conductors 33, 34, 35 and signal processor pins $p_3$–$p_5$ through resistors $R_1$–$R_3$, pads $P_3$–$P_5$ and connectors $C_3$–$C_5$. When the trip unit circuit 10 is tested for operation in the field, a test input signal is applied over terminals 60, 61 and a test output signal appears at signal processor pin $p_{11}$, which is applied to an FET 69 connected as a nonlatching switch to the trip relay 70. The trip relay coil $R_{14}$ and diode $D_4$ respond to interrupt the circuit breaker contacts (not shown). As also described in the aforementioned U.S. patent application, a trimming resistor network 55 consisting of resistors $R_4$–$R_8$ and connector links 56–58 is employed for providing trimming facility to the signal processor at pin $p_{19}$ over conductor 59 and connects with the positive bus over conductor 66 through resistor $R_8$. Power input to the signal processor is applied to pin $p_{16}$, which connects with the positive bus through resistor $R_{12}$, as indicated. Diode $D_1$ in combination with capacitors $C_1$, $C_2$ and resistor $R_{10}$ filter any noise frequency signals from the positive bus and further provide stored energy for powering the trip relay. Power voltage regulation is controlled by the signal processor using output port pin $p_{17}$, which connects to the gate of power FET 62 over conductor 63. Power voltage is sensed by the signal processor at pin $p_{15}$ which is connected to the positive bus through resistor $R_{13}$. A reference voltage signal is provided to the signal processor at pin $p_{18}$ which connects with the positive bus through resistor $R_{11}$ and conductor 65 while connecting with reference ground through the Zener diode $D_3$. The pickup code generated by the signal processor at pin $p_{14}$ is applied to pin $p_{30}$, where it is available to automated test equipment for originally setting the pickup values within the signal processor and for later reading the encoded pickup values for verification. A ceramic resonator 68, connected across pins $p_{12}$, $p_{13}$, provides the clocking reference for the signal processor. Reference ground connection to the signal processor is made over conductors 72, 73 at pins $p_6$, $p_7$. An instantaneous trip network 71 for providing various instantaneous trip options comprises switches $S_1$–$S_3$ and conductors 74–76 and is applied to the signal processor at pins $p_8$–$p_{10}$.

The electrical interconnection between the rating plug 49 and the trip unit printed wire board 79, which carries the trip unit circuit components, is shown in FIG. 2. Although pads $P_1$–$P_{18}$ are shown in FIG. 1, only pads $P_3$, $P_{12}$ and $P_4$, $P_{13}$ are depicted on the rating plug to show the electrical interconnection with corresponding connectors $C_3$, $C_{12}$ and $C_4$, $C_{13}$. It is noted that opposing pads $P_3$, $P_{12}$ and $P_4$, $P_{13}$ are electrically insulated from each other by means of the bottom edge 80 of the rating plug, which itself is comprised of an insulative plastic composition. This allows pads $P_3$, $P_4$ on side 49A to be electrically connected with printed metal conductors 82 and 83 on the printed wire board 79 by means of hook-shaped arms 81A which comprise one-half of the pliable split connector 81 and which forms the corresponding connectors $C_3$ and $C_4$. The split connectors are mechanically and electrically connected with the printed wire board 79 by means of solder pads 84. Electrical connection with the other surface 49B of the rating plug is made by means of connectors $C_{12}$, $C_{13}$, which consist of hook-shaped arms 81B for electrically connecting pads $P_{12}$, $P_{13}$ with printed metal conductors 85, 86. Electrical connection between the components on the printed wire board, such as rating resistor $R_{15}$, is made by means of printed metal conductor 87 on surface 49A and printed metal conductor 88 on surface 49B. Electrical connection between the printed metal conductors on opposite surfaces of the printed wire board is made by through-hole conductor 77. It is noted that electrical interconnection with the printed wire board is made by the connection of the rating plug with the printed wire board without the need for any intermediate switches of any kind whatsoever.

Figure 3A:
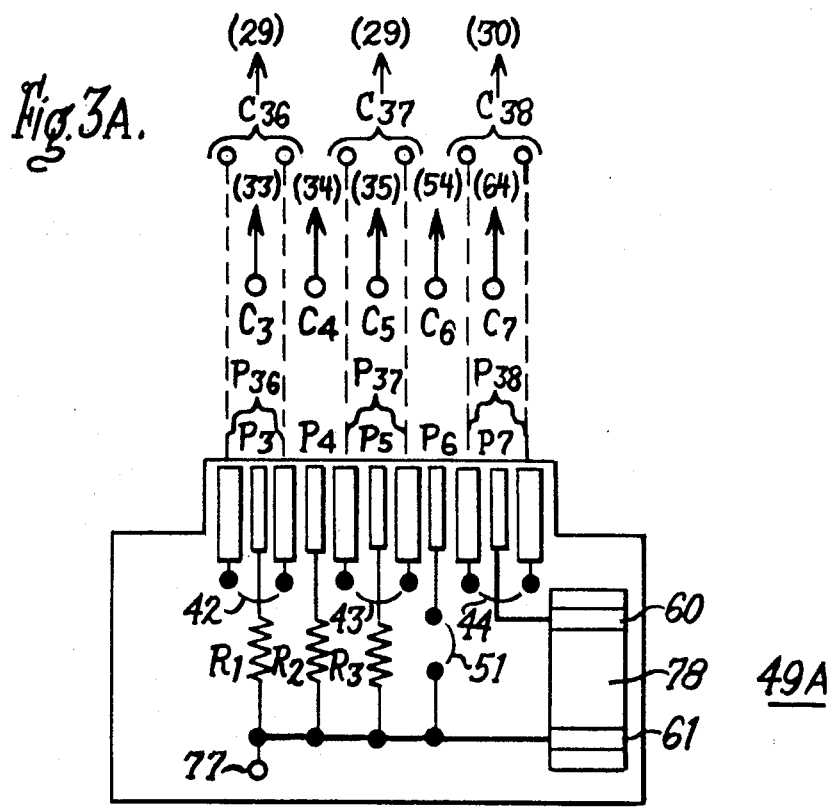
FIGS. 3A and 3B are front and rear views of an alternative embodiment of the rating plug of the invention.
Figure 3B:
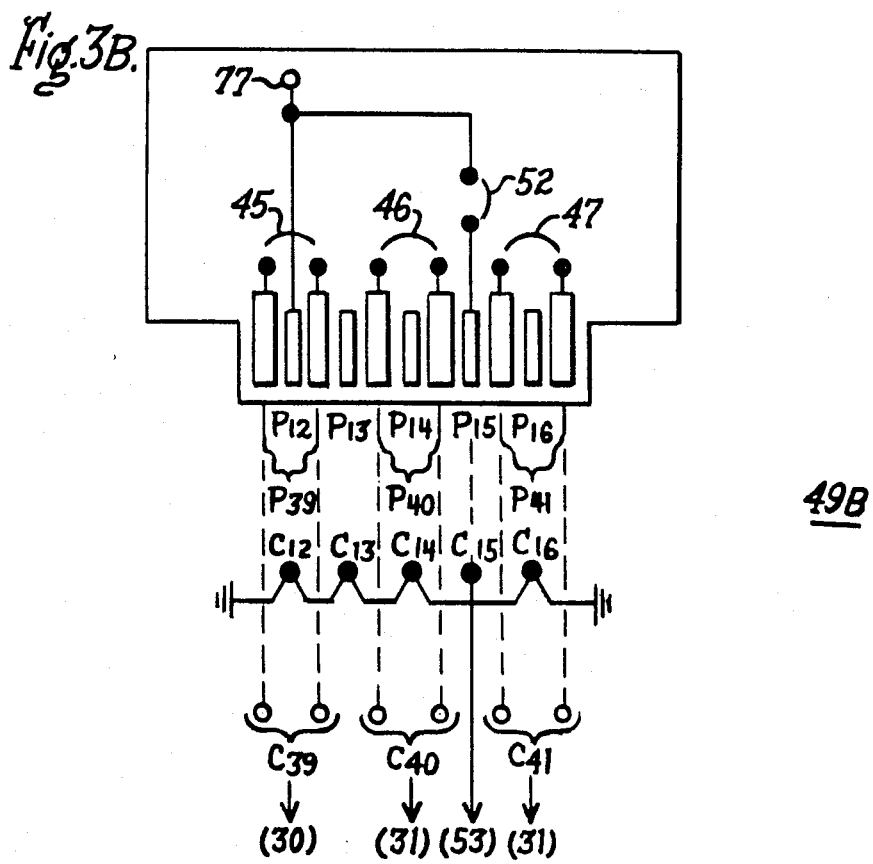

Transformer tap selection facility to the rating plug is conveniently provided by pad pairs $P_{36}$–$P_{38}$ shown in FIG. 3A on surface 49A and pad pairs $P_{39}$–$P_{41}$ shown on surface 49B in FIG. 3B. The pad pairs $P_{36}$–$P_{41}$ correspond to the transformer secondary winding contact pairs 36–41 depicted in FIG. 1, which are interconnected by connector links 42–47, accessible on both rating plug surfaces 49A, 49B as shown, and which selectively connect the transformer taps with the rectifiers 29–31. Burden resistor selection facility to the rating plug is provided by insertion of the rating plug pads $P_3$–$P_7$ and $P_{12}$–$P_{16}$ within corresponding connectors $C_3$–$C_7$ and $C_{12}$–$C_{16}$ which provides electrical interconnection between the rating plug and conductors 33–35, 54, 64 as indicated. Once the rating plug is inserted within the rating plug circuit on the printed wire board, the selected connector links 42–47 provide selected electrical connection with the predetermined transformer secondary taps to provide a range of circuit breaker ampere ratings. The selection of rating resistors $R_1$–$R_3$ along with the selected transformer tap connections extends the range of selections of the circuit breaker ampere rating. Connector links 51, 52 determine the pickup options in the manner described within the aforementioned U.S. patent application to Graham Scott et al. The test terminals 60, 61, carried on the rating plug by means of insulated plug connector 78, provide the test facility described earlier. The electrical interconnection between both surfaces 49A, 49B of the rating plug are made by means of through-connectors 77, as also described earlier.

Figure 4A:
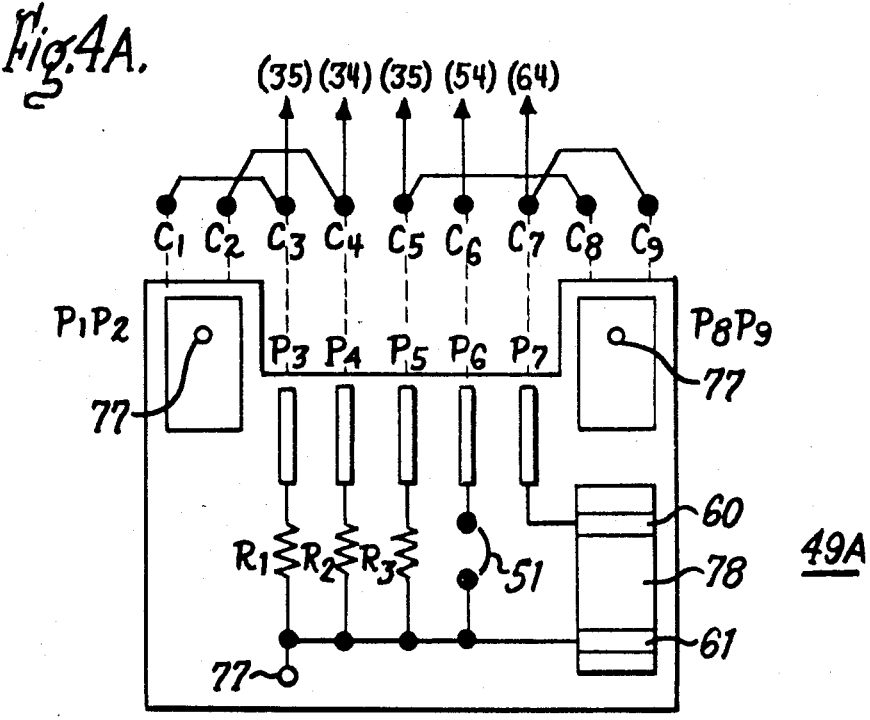
FIGS. 4A and 4B are front and rear views of a further embodiment of the rating plug of the invention.
Figure 4B:
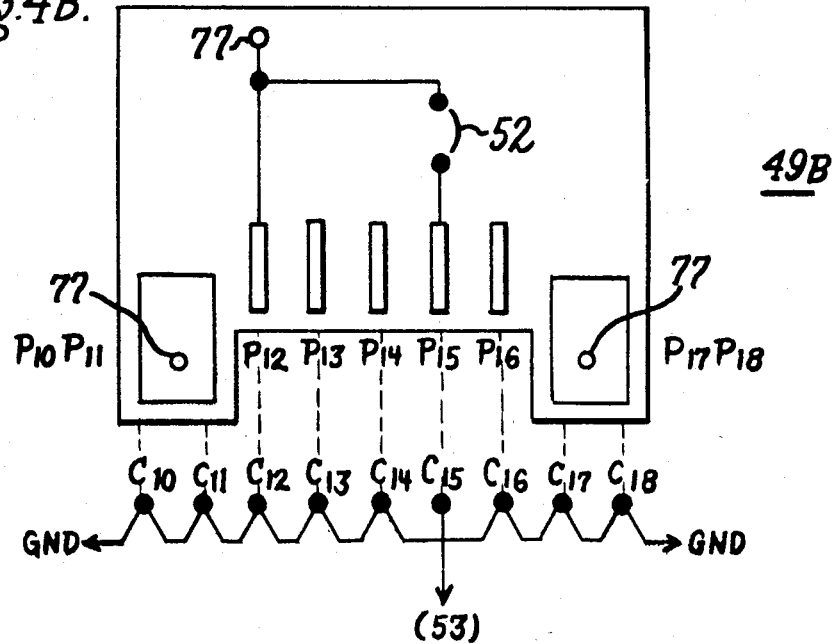

To provide "make to ground before break" facility, pads $P_1$, $P_2$, $P_8$, $P_9$, $P_{10}$, $P_{11}$ and $P_{17}$, $P_{18}$ are arranged ahead of the remaining rating plug pads $P_3$–$P_7$ and pads $P_{12}$–$P_{16}$ as shown in the embodiment depicted in FIGS. 4A and 4B. Pads $P_1$, $P_2$ electrically connect with ground via hole 77 to pad $P_{10}$ and pad $P_{11}$, while pads $P_8$, $P_9$ electrically connect with ground via hole 77 to pad $P_{17}$ and pad $P_{18}$. Pads $P_{10}$, $P_{11}$ connect with ground by means of connectors $C_{10}$, $C_{11}$ while pads $P_{17}$, $P_{18}$ connect with ground by means of connectors $C_{17}$, $C_{18}$. Electrical connection between reference ground and pads $P_{12}$–$P_{14}$ and $P_{16}$ is made by insertion within connectors $C_{12}$–$C_{14}$ and $C_{16}$, which directly connect with reference ground. As indicated, pad $P_{15}$ connects with the function select pin $p_2$ on the signal processor in FIG. 1 over conductor 53 by connection with connector $C_{15}$.

The automatic "make to ground before break" connection and disconnection arrangement between the rating plug 49 and the printed wire board 79 for connecting the current transformer secondary winding to ground to prevent overvoltage damage to the current transformer is seen by now referring to FIGS. 5A–5H. The opposite surfaces 49A, 49B of the rating plug are electrically insulated from each other by means of the central plastic body portion 89 to provide electrical integrity between both hook-shaped arms 81A, 81B of the hook-shaped spring connector 81 described earlier with reference to FIG. 2. For the arrangement depicted in FIGS. 5A–5H, the rating plug contains all the pads depicted in FIGS. 4A, 4B but only pads $P_1$, $P_{10}$ the "grounding pads" and pads $P_3$, $P_{12}$ which connect with the rating resistors $R_1$–$R_3$ will be exemplified. Comparing FIGS. 5A and 5B, which depict the rating plug which contains all the pads previously illustrated within the printed wiring board which contains all the connectors previously illustrated, the rating plug 49 is seen disconnected from the printed wiring board 79 and the legs 81A, 81B which define the connectors $C_1$, $C_{10}$. Connector $C_{10}$ directly connects with system ground connector and connector $C_{12}$ directly connects with connector $C_3$. Connector $C_3$ also connects with the output of current sensing transformer 11 through rectifier 29 and conductor 33, as best seen in FIG. 1. The output of current sensing transformer 11 is therefore connected with reference ground prior to insertion of the rating plug. In a similar manner, connector $C_4$ connects current sensing transformer 12 to ground through rectifier 30, conductor 34 and connector $C_{13}$. Current sensing transformer 13 is connected to ground through rectifier 31, conductor 35, connector $C_5$ and connector $C_{14}$. Since all the connectors $C_1$–$C_9$, excluding $C_6$, which cooperate with pads $P_1$–$P_9$ on surface 49A of the rating plug electrically connect to ground with connectors $C_{10}$–$C_{18}$, excluding $C_{15}$, which cooperate with pads $P_{10}$–$P_{18}$ on the opposite surface 49B, the burden resistors of the rating plug are replaced with short circuit connections with reference ground prior to insertion of the rating plug. This is an important feature of the instant invention since no harmful voltages can develop across the output windings of the current transformers at this time.

Figure 5A:
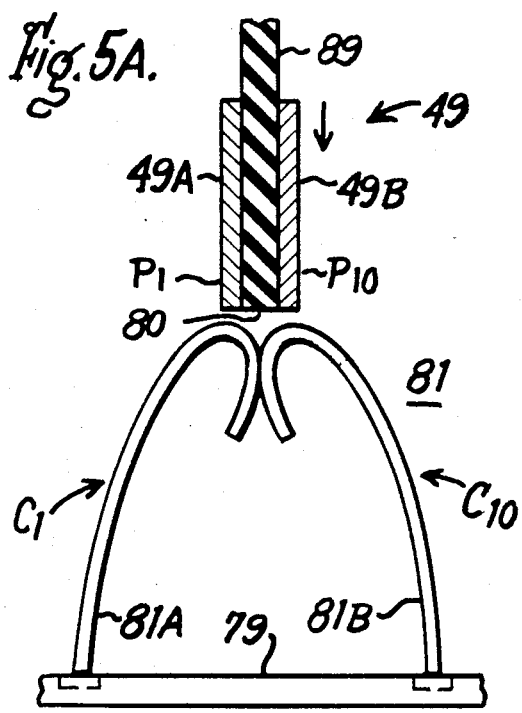
Figure 5B:
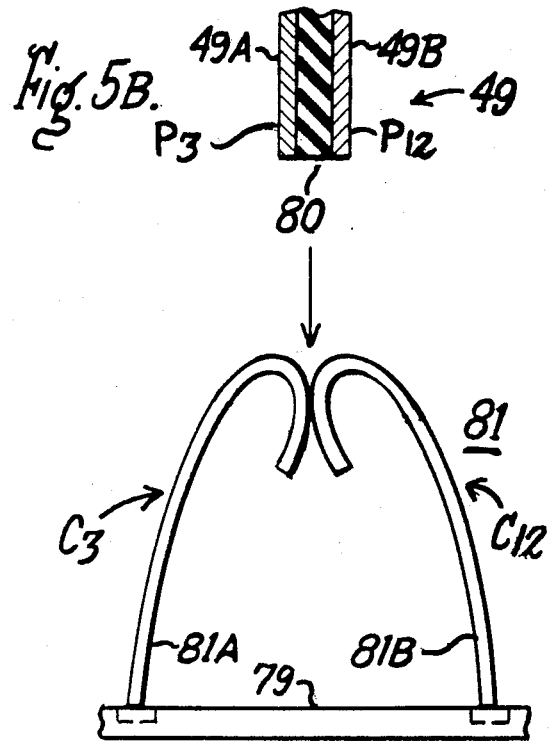
Figure 5C:
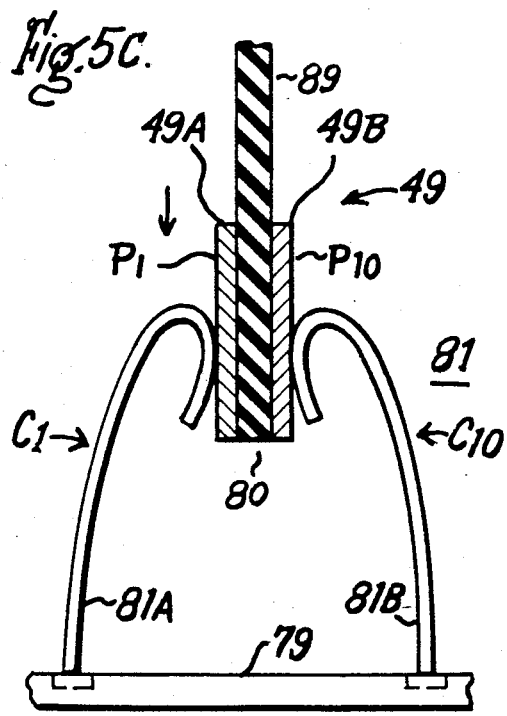
Figure 5D:
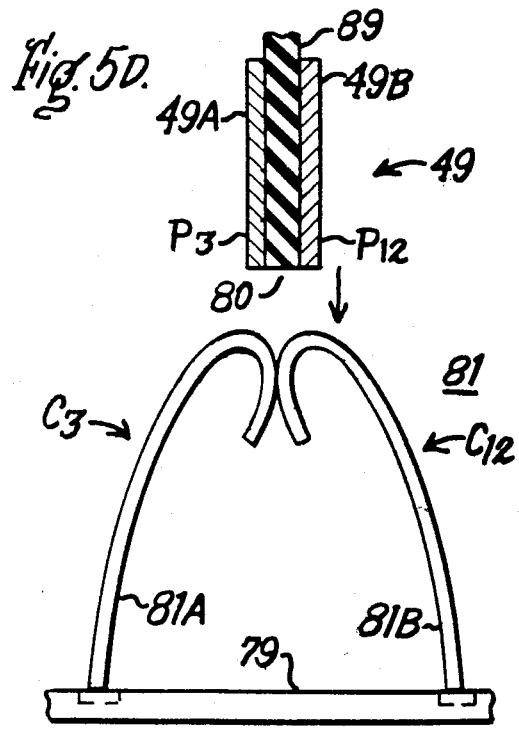

Referring now to FIGS. 5C and 5D wherein the rating plug 49 is first inserted within the rating plug circuit, pads $P_1$, $P_{10}$ immediately contact connectors $C_1$, $C_{10}$, while at the same time breaking contact between connectors $C_1$, $C_{10}$. This is also true for pads $P_2$, $P_8$, $P_9$, $P_{11}$, $P_{17}$, $P_{18}$ and connectors $C_2$, $C_8$, $C_9$, $C_{11}$, $C_{17}$, $C_{18}$, which are arranged on the rating plug in a similar manner. It is noted by referring to FIG. 5D that contact is not broken between connectors $C_3$, $C_{12}$ and that pads $P_3$, $P_{12}$ are not as yet electrically connected within the rating plug circuit. This is also true for pads $P_4$–$P_7$, $P_{12}$–$P_{16}$ and connectors $C_4$–$C_7$, $C_{12}$–$C_{16}$, which are arranged on the rating plug in a similar manner.

FIGS. 5E, 5F show the rating plug pads inserted a further distance within the rating plug circuit contacts wherein there is an overlap in electrical connection between the "grounding pads" $P_1$, $P_{10}$ and pads $P_3$, $P_{12}$. That is, pads $P_1$, $P_{10}$ contact connectors $C_1$, $C_{10}$ at the same time pads $P_3$, $P_{12}$ contact connectors $C_3$, $C_{12}$. In this manner contacts $C_3$ and $C_{12}$ have been separated and make mechanical contact with $P_3$ and $P_{12}$ on the rating plug. Since $P_1$ is still concurrently making contact with $C_1$ and $C_{10}$ is still concurrently making contact with $P_{10}$, then $P_3$ and $P_{12}$ are still electrically connected to reference ground. As stated earlier, this is also true for pads $P_4$–$P_7$ excluding $P_6$ on rating plug surface 49A as well as for pads $P_{13}$–$P_{16}$ excluding $P_{15}$ on the opposite rating plug surface 49B.

Finally, as shown in FIGS. 5G, 5H, the rating plug pads are completely inserted within the rating plug circuit connectors whereby pads $P_1$, $P_{10}$ are out of contact with connectors $C_1$, $C_{10}$ and pads $P_3$, $P_{12}$ contact connectors $C_3$, $C_{12}$ as indicated. All the grounding pads $P_1$, $P_2$, $P_8$, $P_9$, $P_{10}$, $P_{11}$, $P_{17}$, $P_{18}$ are electrically disconnected from the rating plug circuit at this point and pads $P_3$–$P_7$ and $P_{12}$–$P_{16}$ are electrically connected whereby the trip unit circuit is operational and the circuit breaker ampere rating has been accurately set. In removing the rating plug from the rating plug circuit, it is noted by reversing the procedures, that the "make to ground before break" concept still applies.

It has thus been shown that a plurality of functions such as circuit breaker ampere rating, test facility function, "make to ground before break" connection, along with overcurrent pickup function selection can be accomplished by the unique connective arrangement between the rating plug and the trip unit circuit. The "make to ground before break" arrangement of the invention prevents dangerous high voltage conditions across the current transformer secondary winding, which has heretofore required either mechanical interlocks to trip the breaker, thus removing primary drive from the current transformers or the use of default burden resistors which substitute for the removed burdens of the rating plug. Referring to the above description, it was noticed that pads $P_6$ and $P_{15}$ were at no time connected to ground but connected to each other by connectors $C_6$ and $C_{15}$. It is a feature of the trip unit signal processor 50 that signal lines FUNCSEL 1 and FUNCSEL 2 are internally pulled to a high logic level by a resistor embodied within the IC. The logical state of both signal lines being high is interpreted by the IC as a request to trip as soon as sufficient power is available, as detected by VHRSEN at pin $p_{15}$.

Having thus described my invention, what I claim as new and desire to secure by Letters Patent is:

1. An electronic trip unit for molded case circuit breakers comprising:
   current sensing transformers having a secondary winding sampling electric current through a protected circuit to provide a sample current value;
   signal processor means for comparing said sample current value to predetermine overcurrent values to determine whether to provide a trip output signal based upon said comparison;
   rating plug circuit means comprising a plurality of spring connectors electrically connected with said signal processor for developing a voltage representation of said sampled current value;
   said spring connectors each comprising first and second legs, said first and second legs being spring-loaded together in electrical contact with each other; and
   a first plurality of said conductive pads becoming electrically connected with said first legs when said rating plug is connected with said rating plug circuit and said first and second legs becoming electrically disconnected from each other, said first plurality of conductive pads arranged on said rating plug and contacting said first legs before said second plurality of conductive pads contact said second legs.

2. The electronic trip unit of claim 1 including removable rating plug means connectable with said rating plug circuit and comprising an insulative support carrying a plurality of conductive pads electrically insulated from each other and arranged for connection with said plurality of spring connectors.

3. The electronic trip unit of claim 1 including a plurality of contact pairs arranged on said trip unit for selective electrical interconnection with said current sensing transformers by means of connected links.

4. The electronic trip unit of claim 1 wherein said current sensing transformers each include a secondary winding including an electrical tap connection.

5. The electronic trip unit of claim 1 wherein a first plurality of said contact pairs connect with said secondary winding and a second plurality of said contact pairs connect with said electrical tap connection.

6. The electronic trip unit of claim 1 wherein a second plurality of said conductive pads becomes electrically connected with said second legs when said rating plug is connected with said rating plug circuit.

7. The electronic trip unit of claim 1 wherein said first legs are selectively connected with system ground within said rating plug circuit and said second legs are connected with said signal processor.

8. The electronic trip unit of claim 1 wherein said second plurality of conductive pads are electrically connected with a burden resistor mounted on said rating plug.

9. The electronic trip unit of claim 1 wherein said rating plug support comprises two sides and wherein a part of said first and second pads are arranged on each of said two sides.

* * * * *